United States Patent [19]

Katou et al.

[11] Patent Number: 4,703,383

[45] Date of Patent: Oct. 27, 1987

[54] COIL CONDUCTOR STRUCTURE IN THIN-FILM MAGNETIC HEAD

[75] Inventors: Yoshiaki Katou; Joe Ueoka; Satoshi Yoshida, all of Kanagawa, Japan

[73] Assignee: Fuji Photo Film Co., Ltd., Japan

[21] Appl. No.: 783,577

[22] Filed: Oct. 3, 1985

[30] Foreign Application Priority Data

Oct. 5, 1984 [JP] Japan ............................ 59-209067

[51] Int. Cl.⁴ ........................... G11B 5/17; G11B 5/31
[52] U.S. Cl. ...................................... 360/126; 360/123
[58] Field of Search .............................. 360/126, 123

[56] References Cited

U.S. PATENT DOCUMENTS 4,416,056 11/1983 Takahashi ......................... 360/123

Primary Examiner—Robert S. Tupper

Attorney, Agent, or Firm—Gerald J. Ferguson, Jr.; Michael P. Hoffman; Michael J. Foycik, Jr.

[57] ABSTRACT

A thin-film magnetic film composed of a substrate, a lower magnetic layer, a first insulating layer, a coil conductor, a second insulating layer, and an upper magnetic layer accumulated in this order. The cross-section of the coil conductor has a trapezoidal shape having skirts at the lower end of the sides thereof. Owing to the presence of the skirts, the surface of the second insulating layer formed thereon can be made flat by ion etching, and consequently the surface of the upper magntic layer is made flat. The incident angle of the ion beam and the thickness of the photoresist used in the ion etching process to make the pattern of the coil conductor layer are determined so that the cross-sectional shape of the coil conductor is a trapezoid having skirts at the lower ends thereof.

4 Claims, 10 Drawing Figures

COIL CONDUCTOR STRUCTURE IN THIN-FILM MAGNETIC HEAD

BACKGROUND OF THE INVENTION

1. Field of the Invention

This invention relates to a thin-film magnetic head and a method of making the same, and more particularly to a thin-film magnetic head comprising accumulated thin films of a magnetic material, a coil conductor and insulating layers wherein said coil conductor is made by an ion etching process, and a method of making the thin-film magnetic head.

2. Description of the Prior Art

Various kinds of magnetic recording and reproducing apparatus which record and reproduce electric signals by use of a magnetic recording medium have heretofore been developed. Accompanying the development of the magnetic recording medium which is made compact in size and has various kinds of shapes, there has been developed a variety of types of magnetic heads adapted to the various magnetic recording media. Particularly, for the magnetic recording medium of the disc shape, e.g. a disc having the recording annular area of the innermost radius of 15 mm and the outermost radius of 20 mm, a very compact magnetic head utilizing a thin film has become frequently used, in view of its required compactness. The thin-film magnetic head is now becoming a popular magnetic head for compact magnetic discs owing to its compactness, and further because of the advantage of being easily adapted to multi-channel recording.

One example of the structure of the thin-film magnetic head is as follows. Firstly, a lower magnetic layer in the shape of a thin film is formed on a substrate. Then, a first insulating layer is formed thereon in the shape of a thin film, and subsequently a coil conductor layer also in the shape of a thin film is formed thereon. The coil conductor layer is made into a pattern layer by use of an ion etching process. After this, a thin film of a second insulating layer is formed on the coil conductor layer. Since the surface of the patterned coil conductor layer is waved or stepped, the surface of the second insulating layer is waved or stepped as well. The waved surface of the second insulating layer will affect the magnetic property of the magnetic layer later disposed thereon, and accordingly, a photoresist layer is provided on the second insulating layer before the magnetic layer is disposed, and the surface of the second insulating layer including the photoresist layer, is subjected to an ion etching process to make the surface of the second insulating layer flat. On the flat surface of the second insulating layer, after ion etching, an upper magnetic layer in the form of a thin film is formed.

In the above-described thin-film magnetic head, however, there arises the problem that the surface of the second insulating layer cannot be made perfectly flat, because the surface of the coil conductor layer, after it has been patterned by the ion etching process, is so waved or stepped. This problem will now be explained in detail referring to FIGS. 4A to 4C.

On a substrate 101 are accumulated thin films of a lower magnetic layer 102, a first insulating layer 103, and a coil conductor layer 104 in this order, and on the coil conductor layer 104 is formed a second insulating layer 105. On the surface of the second insulating layer 105, at the edge of the protruded parts caused by the protruded coil portions of the coil conductor layer 104, V-shaped grooves 105A, as shown in FIG. 4A, are formed. The shape of the V-shaped grooves 105A changes according to the shape of the coil conductor layer 104, the thickness of the second insulating layer 105 and so forth, and accordingly it is difficult to predict the depth or shape thereof and completely remove them by the flattening step, by ion etching, as shown in FIG. 4B. When the upper magnetic layer 106 is formed on the second insulating layer 105 which has such surface irregularities in the form of the V-shaped grooves, the surface of the upper magnetic layer 106 will thus also have grooves as shown in FIG. 4C, the magnetic resistance of the upper magnetic layer 106 is thus substantially increased and the efficiency of the magnetic head is materially lowered.

SUMMARY OF THE INVENTION

In view of the above described problem, the principal object of the present invention is to provide a thin-film magnetic head which is free from surface grooves and has a high magnetic recording and reproducing efficiency.

Another object of the present invention is to provide a method of making a thin-film magnetic head free of surface irregularities on the upper magnetic layer thereof and having high performance.

The thin-film magnetic head in accordance with the present invention is characterized in that the cross-section of the coil conductor has a trapezoidal shape having skirts at the lower ends thereof.

The method of making the thin-film magnetic head in accordance with the present invention is characterized in that the incident angle of the ion beam and the thickness of the photoresist used in the ion etching process to make the pattern of the coil conductor layer are determined so that the cross-sectional shape of the coil conductor is a trapezoid having skirts at the lower ends thereof. That is, the thickness of the photoresist layer is determined according to the thickness of the coil conductor layer and the interval or space between coil conductors, and the incident angle (the angle between the ion beam and the normal to the layers) of the ion beam is selected to be within a predetermined range to form skirts at the lower ends of the trapezoidal cross-section of the coil conductors. The "skirts" referred to here means substantially triangular additional cross-sectional portions added to the foot portion of the trapezoidal cross-section of the coil conductor. The size of the skirts depends upon the above-mentioned factors, such as the thickness and intervals of the coil conductors which determine the thickness of the photoresist and the incident angle of the ion beam.

DESCRIPTION OF THE PREFERRED EMBODIMENT

Figure 1:
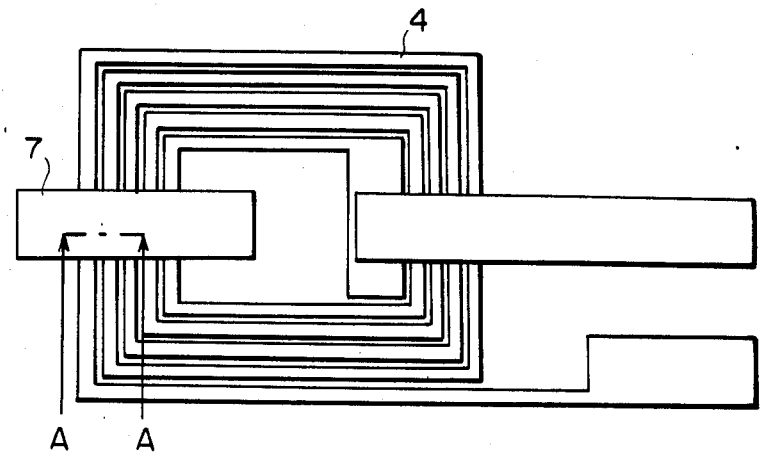
FIG. 1 is a plan view schematically showing a thin-film magnetic head in accordance with an embodiment of the present invention.

Here the present invention will be described in detail with reference to a particular embodiment thereof shown in FIGS. 1 and 2A to 2E.

In general, a thin-film magnetic head is comprised of a substrate 1 of a magnetic material as of ferrite or a non-magnetic material as of $Al_2O_3$, $Al_2O_3$-TiC, a lower magnetic layer 2, a first insulating layer 3, a coil conductor 4, a second insulating layer 5 and an upper magnetic layer 6 accumulated in this order. These layers of thin films are accumulated by the process as shown in FIGS. 2A to 2E.

Figure 2A:
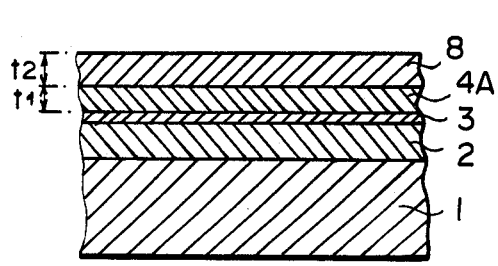
FIGS. 2A to 2E are cross-sectional views taken along line A-A in FIG. 1 which explain the process of making the thin-film magnetic head in accordance with an embodiment of the present invention.
Figure 2B:
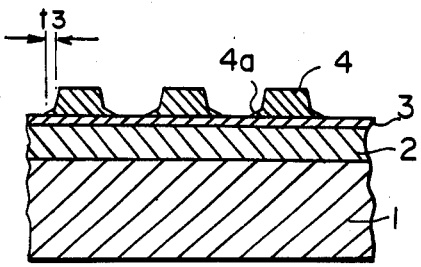

Firstly, on a substrate 1, a lower magnetic layer 2 is disposed by vacuum deposition or sputtering of a magnetic material such as permalloy, amorphous, Sendust, etc. Then, on the lower magnetic layer 2, is formed a first insulating layer 3 of $SiO_2$, $Al_2O_3$, BeO, etc. by vacuum deposition or sputtering. Then, on the first insulating layer 3 is formed a coil conductor layer 4A by vacuum deposition or sputtering. For the coil conductor layer 4A, Al, Cu, Al-alloy, Cu-alloy, etc. is used. On the coil conductor layer 4A of thickness t1, a photoresist 8 (e.g. AZ-1350J made by Shiply) of the coating thickness t2 is applied as shown in FIG. 2A. After the photoresist 8 is applied, the photoresist 8 is exposed to light and developed for patterning, and an ion beam is caused to impinge thereupon at an incident angle within a predetermined range. Consequently, after the process of ion etching for a predetermined duration of time, a coil conductor 4, having the cross-section of the trapezoidal shape with skirts formed at the lower ends thereof of such a size that corresponds to the incident angle and the coating thickness of the photoresist, is obtained as shown in FIG. 2B.

Figure 2C:
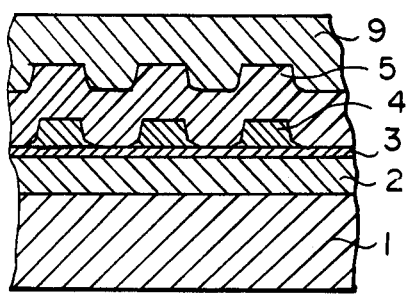
Figure 2D:
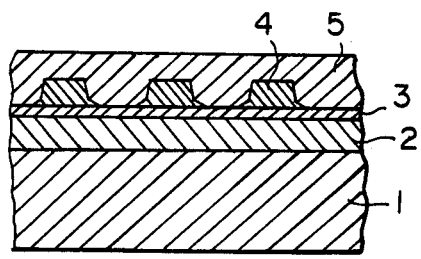
Figure 2E:
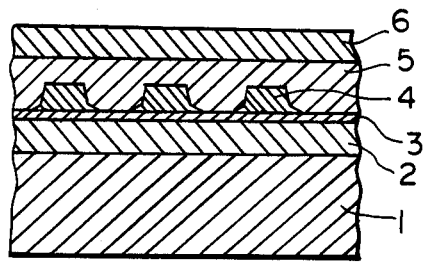
Figure 4A:
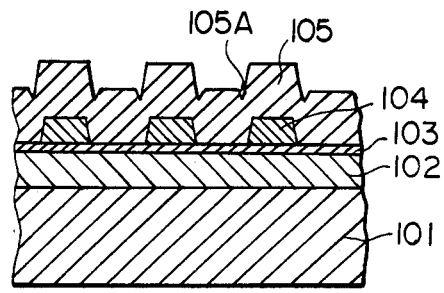
FIGS. 4A to 4C are cross-sectional views of a thin-film magnetic head showing a conventional method of making the same.
Figure 4B:
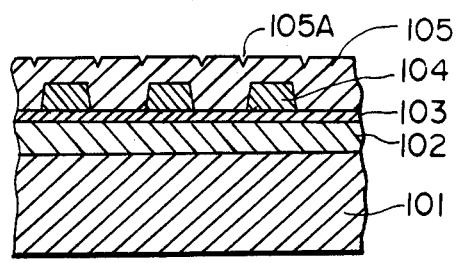
Figure 4C:
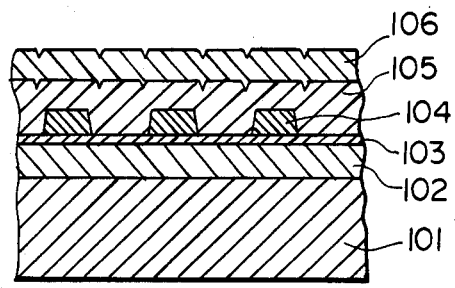

After the coil conductor 4 is formed, a second insulating layer 5 of $SiO_2$, $Al_2O_3$, BeO, etc. is formed thereon by vacuum deposition or sputtering. At this step, since the coil conductor 4 has skirts 4a and does not have sharp edges at its feet, there appears no V-shaped grooves on the surface of the second insulating layer 5. Therefore, by conducting an ion etching process with an ion beam having an incident angle which results in the same etching speed for the second insulating layer 5 and the photoresist 9 provided thereon, the surface of the second insulating layer 5 can be made flat as shown in FIG. 2D. FIG. 2C shows the cross-section of the layers after the photoresist 9 has been applied on the second insulating layer 5. Further, on the flattened second insulating layer 5, an upper magnetic layer 6 is disposed by vacuum deposition or sputtering of permalloy, amorphous, Sendust, etc. as shown in FIG. 2E.

Figure 3:
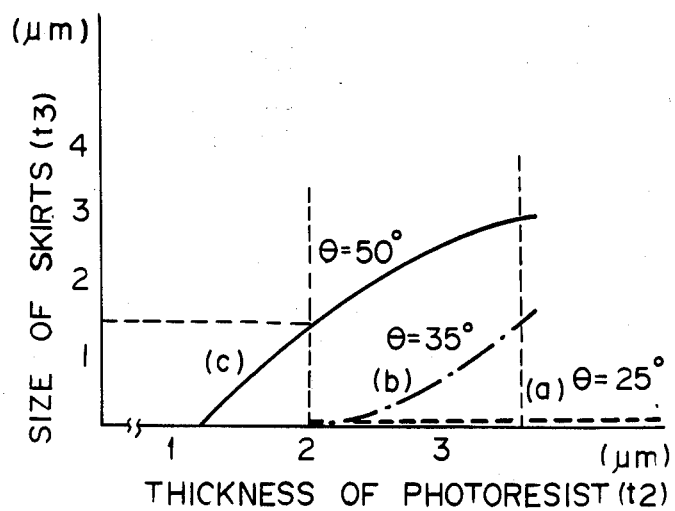
FIG. 3 is a graph which shows the relationship between the degree of spread of the skirts of the coil conductor, and the thickness of the photoresist for different incident angles of the ion beam.

The degree of spread or size t3 of the skirts 4a of the coil conductor layer 4A is determined by the thickness of the photoresist 8 and the incident angle of the ion beam at the time of ion etching. For the case in which the coil conductor 4 is made of Cu, the thickness t1 of the coil conductor layer 4A is 1.8 $\mu$m and the intervals between adjacent coil conductors 4 are 5.0 $\mu$m, the relationship between the coating thickness t2 of the photoresist 8 and the size t3 of the skirts 4a for different incident angles $\theta$ of the ion beam is shown in FIG. 3. The curve (a) is for a 25°, (b) for a 35° and (c) for a 50° incident angle of the ion beam.

As apparent from FIG. 3, the larger the incident angle $\theta$ of the ion beam and the larger the thickness t2 of the photoresist 8 are, the larger the size of the skirts 4a of the coil conductor 4 becomes. When the thickness of the coil conductor layer 4A is 1.8 $\mu$m, the photoresist 8 must have the thickness of at least 2.0 $\mu$m. If the incident angle $\theta$ of the ion beam is 50° when the thickness t2 of the photoresist 9 has a thickness of 2.0 $\mu$m, the size t3 of the skirts 4a becomes as large as 1.5 $\mu$m. Since the interval or space between adjacent coil conductors 4 is accordingly reduced to 2.0 $\mu$m, there is a possibility that the adjacent coil conductors 4 are electrically connected with each other resulting in short circuit. On the other hand, when the incident angle is 25°, there is no spread of the skirts 4a. Accordingly, for example in the case of a coil conductor 4 made of Cu having a thickness of 1.8 $\mu$m and intervals of 5 $\mu$m, the incident angle $\theta$ of the ion beam at the time of ion etching must be determined in the range of 25° to 50° to obtain a desirable size of skirts 4a. This is the same for the different materials such as Al or Al-alloy. When the thickness and intervals of the coil conductor change, the desirable thickness of the photoresist 9 and the desirable incident angle of the ion beam also change.

In the above-described embodiment, the coil conductor has a single layer. However, it may have a plurality of layers. Further, the number of turns of coil conductor may of course not be limited to 5 as is shown in FIG. 1. It should also be noted that the substrate 1 and the lower magnetic layer 2 may not be separately provided but may be combined into a single material, i.e. a ferromagnetic material substrate.

We claim:

1. A thin-film magnetic head comprising a lower magnetic layer, a first insulating layer, a coil conductor, a second insulating layer, and an upper magnetic layer accumulated in this order characterized in that the cross-section of said coil conductor has a trapezoidal shape having substantially triangular cross-sectional portions disposed at portions of said coil conductor adjacent to said first insulating layer at the lowest end of the sides of said coil conductor, one side of said triangular portions being disposed on said first insulating layer.

2. A thin-film magnetic head as defined in claim 1 wherein said lower magnetic layer is provided on a substrate.

3. A thin-film magnetic head as defined in claim 1 wherein said lower magnetic layer serves also as a substrate of the thin-film magnetic layer.

4. A thin-film magnetic head as defined in claim 1 wherein the surface of said second insulating layer adjacent to said upper magentic layer is flat and smooth.

* * * * *